(12) United States Patent
Kessler et al.

(10) Patent No.: US 7,652,444 B2
(45) Date of Patent: Jan. 26, 2010

(54) ACTUATOR AND METHOD FOR OPERATING AN ACTUATOR

(75) Inventors: Winfried Kessler, Hausen (DE); Alexander Wagenpfeil, Röttenbach (DE)

(73) Assignee: Siemens Aktiengesellschaft, Munich (DE)

( * ) Notice: Subject to any disclaimer, the term of this patent is extended or adjusted under 35 U.S.C. 154(b) by 109 days.

(21) Appl. No.: 10/598,768

(22) PCT Filed: Feb. 16, 2005

(86) PCT No.: PCT/EP2005/050684

§ 371 (c)(1),
(2), (4) Date: Jun. 18, 2007

(87) PCT Pub. No.: WO2005/085965

PCT Pub. Date: Sep. 15, 2005

(65) Prior Publication Data

US 2008/0017245 A1 Jan. 24, 2008

(30) Foreign Application Priority Data

Mar. 9, 2004 (DE) .................. 10 2004 011 457

(51) Int. Cl.
*H02P 5/00* (2006.01)

(52) U.S. Cl. .................. 318/461; 318/466; 714/25; 714/27; 714/31; 700/198; 700/20; 700/78

(58) Field of Classification Search .......... 318/461, 318/369, 466; 701/70; 700/74, 75, 19, 20, 700/78; 714/25, 27, 31

See application file for complete search history.

(56) References Cited

U.S. PATENT DOCUMENTS

| 4,218,735 | A  | * | 8/1980 | McCutcheon ............... 700/90 |
| 4,437,046 | A  | * | 3/1984 | Faillace .................... 318/571 |
| 5,504,679 | A  | * | 4/1996 | Wada et al. ................. 701/41 |
| 6,445,961 | B1 | * | 9/2002 | Melvin ..................... 700/32 |
| 6,463,499 | B1 | * | 10/2002 | Wakeley .................... 710/315 |
| 6,463,634 | B1 | * | 10/2002 | Naohara et al. .............. 24/444 |
| 7,024,508 | B2 | * | 4/2006 | Gros et al. ................. 710/305 |
| 7,089,098 | B2 | * | 8/2006 | Rogg et al. ................. 701/31 |
| 2001/0037907 | A1 |   | 11/2001 | Peter et al. |
| 2002/0185358 | A1 |   | 12/2002 | Zeitler et al. |

FOREIGN PATENT DOCUMENTS

| DE | 42 25 834 A1 | 2/1994 |
| DE | 196 14 654 C | 8/1997 |
| DE | 198 34 868 A1 | 2/2000 |
| DE | 199 57 814 C | 6/2001 |
| JP | 01 023703 A | 1/1989 |

\* cited by examiner

*Primary Examiner*—Rita Leykin
(74) *Attorney, Agent, or Firm*—Henry M. Feiereisen; Ursula B. Day

(57) ABSTRACT

An actuator (10) includes sensors (12) which are used to detect variables representing the operating state of the actuator (10) and are connected to an evaluation unit (16) associated with the actuator (10). The evaluation unit (16) is connected to sensors (12) and/or control actuating elements (13) by means of a first data bus (15). The sensors (12) are used to detect measurable variables representing the operating state of the actuator (10), and to transmit the same to the evaluation unit (16).

25 Claims, 3 Drawing Sheets

ACTUATOR AND METHOD FOR OPERATING AN ACTUATOR

BACKGROUND OF THE INVENTION

Actuators, such as electric motors and hydraulic drives, are used in a very wide variety of sizes and designs in various application areas. It is customary, at least in the case of relatively large actuators, to detect specific operating parameters, for example the temperature of cooling liquid or the temperature of the windings of electric motors or electromagnets, via sensors. In this case, the sensors are mounted at measurement points and a connecting line which is associated with the respective sensor leads to an evaluation unit which processes the sensor data further and optionally also forwards it. On account of communication between the evaluation unit and an external controller via a data bus, the actuator can be operated as a function of the detected data. In this case, the data is transmitted from the evaluation unit to the controller by interrogations initiated by the controller.

Further sensors are required more and more frequently, specifically in electric motors and in particular relatively large electric motors. Therefore, separate sensors, for example, are used to additionally detect the temperatures of the rolling bearings or other bearing systems of the rotor of the motor, in addition to the cooling-water feed temperature and the cooling-water return temperature, winding temperatures, generated torque and the like. A separate data line to the evaluation unit is required for all of these further sensors. Furthermore, the evaluation unit has to be configured as a function of the connected sensors, and this means that each of these configurations requires its own control system in the evaluation unit, which is configured as a function of the connected sensor system and optionally further actuating means, in order to control and evaluate said control systems in an appropriate manner, particularly when an electric motor is used in a very wide variety of configurations.

SUMMARY OF THE INVENTION

In contrast, the object of the invention is to reduce the configuration complexity in the region of the evaluation unit and, with a standard combination of actuator and associated evaluation unit, to allow the greatest possible flexibility in terms of populating the actuator with sensors.

The object is achieved according to one aspect of the invention by an actuator having sensors for detecting measurement variables which represent the operating state and an evaluation unit which is associated with the actuator, with the evaluation unit being connected to at least one from amongst the multitude of sensors and actuating elements via a first data bus. According to another aspect of the invention, the object is achieved by a method for operating an actuator having an evaluation unit and at least one element from amongst the multitude of sensors and actuating elements which is connected to the evaluation unit via a first data bus, with sensors and actuating elements transmitting data, which in particular represents the operating state of the actuator, to the evaluation unit.

Because the elements of the population of sensors and actuating elements are connected to the evaluation unit over a data bus, more flexible control and also a more variable set of equipment for the actuator is possible. The bus structure of the first data bus between sensors and evaluation unit—that is to say whether that bus structure is a star, ring or line or a combination thereof—is matched by a person skilled in the art to the technical requirements and standards, to the properties of the network, its variability and the properties of the surrounding area in which the network is placed (for example electromagnetic waves, temperature protection). It is not absolutely necessary for the transmission medium of the network to be electrical, either. Although it is possible to form the first data bus on a wire basis with electrical signal transmission, for example with shielded cables, an optical bus, for example with glass-fiber cables or else purely optical transmission paths in the visible range or in the infrared range, is equally feasible, for example a data bus which transmits the signals by electromagnetic waves in a cable-free manner.

It is possible for either only sensors or only actuating elements to be connected to the evaluation unit. Both sensors and actuating elements are usually connected to the first data bus.

The advantage of a network can predominantly be seen in that the data can be transmitted between the sensors, the actuating elements and the evaluation unit with a specific protocol. In this case, the information can be transmitted to the evaluation unit both in a periodic/cyclical manner or else by interrogation initiated by the evaluation unit. The protocol for data transmission can equally be matched to the surrounding influences, such as the design of the data bus. In the case of severe interfering influences for example, it is therefore possible to select protocol formats which are particularly well protected against interference.

In addition to the sensors, actuating elements which are connected to the evaluation unit by means of the first data bus can therefore also be arranged in the actuator. Therefore, switching devices, valves, piezo actuators, braking devices or blocking means which act directly on the motor or the drive shaft of the motor may be provided, for example in the case of stepper motors or other linear drives. These prevent a rotary movement of the rotor, for example when the rotor is not subjected to a drive torque, which at least ensures that the rotor is held still. In this case, the actuating element can be both controlled and monitored by the evaluation unit. To this end, sensor data and also state information about the actuating element can be supplied to the evaluation unit, this being preformed by means of the first data bus.

According to one advantageous refinement of the invention, the evaluation unit is connected to a controller via a second data bus, so that a superordinate open-loop/closed-loop control system can access the information in the evaluation unit and/or can transmit instructions and information to said evaluation unit.

Therefore, in this advantageous refinement, not only sensors but also actuating elements which are directly associated with the actuator can be connected to the evaluation unit and thus be controlled by a controller which is connected to the evaluation unit, and corresponding state data about the actuator can also be checked indirectly by the controller. This is a measure which initially directly concerns the operation and control of such actuating elements in an actuator, but at the same time also increases the operational reliability of the actuator and the actuating element since more information can be transmitted to the controller in a simple manner, with the information being supplied to the controller only via a small number of communications devices and, in turn, this reliable and advantageous communication provides an opportunity to make inspections, or else makes inspections easier.

According to one particularly preferred refinement of the invention, further data can also be temporarily stored in the evaluation unit in addition to the measurement data in the case of the sensors, and in addition to the state information in the case of the actuating elements if present, with this further data being, in particular, at least identification data and operating parameter data.

The identification data which can be transmitted to the evaluation unit can be used to ensure that the evaluation unit correctly identifies the sensor or the actuating element, and a check can be made as to whether a sensor has been replaced between two starting operations of the device. The state of the system and its components can thus be monitored in a simple manner, so that, in the case of repairs or maintenance work for example, a check is firstly made that all of the sensors which are required are correctly connected, and secondly it is possible to verify whether the connected sensor is suitable in terms of type for use at this point. This may be determined, for example, from the sensor data which comprises the sensor type, the manufacturer, the order number, and the version number. To this end, corresponding information can be stored, for example in a table, in the evaluation unit in particular, which table, as a function of the configuration of the system, defines the point of the network at which sensors have to be provided and which sensors are permitted at this location. Furthermore, an actuator can also have a configuration memory in which the configuration of sensors, actuating elements and in particular their respectively required specification is stored in a manner which can be read out by the evaluation unit.

A transmission of operating parameter data to the evaluation unit from the sensor can establish which format the data has for each of the signal types of the sensor and it can, for example, by prespecifying in nominal values and values of related functions, specify a sensor characteristic curve, which characterizes the sensor behavior with respect to measurement variables. As a result, the conversion of the sensor value, such as a voltage, into a measurement variable, such as the temperature prevailing in the region of the sensor, occurs first in the evaluation unit, so that it is a function of the characteristic curve of the sensor. The maximum operating ranges, supply voltage design and similar characteristics of the sensor can also be stored there. A sensor equipped in this way measures component voltage values for the purpose of determining the temperature, for example. The measured analog value is converted into a digital value in the sensor, this digital value being transmitted to the evaluation unit via the first data bus. In the evaluation unit, it is converted into the temperature value with reference to the characteristic curve of the sensor which has been transmitted to the evaluation unit by the sensor. The evaluation unit then transmits the value of the temperature in the region of the sensor to the controller, which executes its control method as a function of the temperature value and not the measured voltage value, on demand or in a cyclical manner. The advantage of this procedure can be seen in that, when the sensor is replaced by a sensor with different characteristic data—for example because the characteristic curve has been determined by measurement for the individual sensors without manufacturer tolerances—it is possible to match the behavior of the system to the changed sensor. If one sensor is replaced by another, the voltage/temperature relationship of the individual sensor is automatically taken into account by transmitting the operating parameter data of the sensor to the evaluation unit, and the voltage signal is correspondingly individually converted into a temperature value. At the same time, the operating parameters of the individual sensors can be interrogated through the controller. It is therefore possible to use the controller, as well as the evaluation unit, to check and validate whether a sensor having the suitable measurement range is providing the measurement.

According to one preferred refinement of the invention, the actuator is an electric motor. The electric motor is particularly an actuating drive, such as a linear drive, and furthermore preferably has at least one actuating element in the form of a return blocking means or brake which blocks a rotary movement of the electric motor in the driveless state at least in one direction of rotation. In this case, a position-measuring system for detecting the position of the linear drive may be provided as one of the sensors which is associated with the motor.

In further preferred refinements of the invention the evaluation unit is arranged in the housing of the actuator, with a plug connection on the outside of the housing in order to connect the evaluation unit to the controller, which is possible via a second data bus that is preferably arranged outside the actuator according to a further refinement, preferably via only one cable. This procedure allows the infrastructure upstream of the evaluation unit to be led toward the controller via a single cable which is, in particular, a conventional data bus cable. Downstream of the evaluation unit, a bus which is matched to the specific conditions in the region of the actuator can be used. In this case, the infrastructure downstream of the evaluation unit can, for example, comprise a plurality of bus lines which each have particular associated sensors or actuating elements. This firstly limits and reduces the cabling outlay within the actuator, and at the same time the actuator can be controlled by the controller via a standardized interface independently of the configuration downstream of the evaluation unit, with the available functionalities and sensor devices being designed such that they can be interrogated by the controller via the evaluation unit.

A method according to the present invention serves to operate the actuator which has an evaluation unit and at least one element from amongst the multitude of sensors and actuating elements which is connected to said evaluation unit via a first data bus, with the sensors and actuating elements transmitting data to the evaluation unit. In this case, the sensors can advantageously detect the measurement variables which represent the operating state of the actuator and transmit them to the evaluation unit.

According to one preferred refinement, the evaluation unit transmits data to a controller via a second data bus. This advantageous method makes it possible to conduct communication with the outside via a conventional data bus, specifically the second data bus, whereas configuration-dependent communication between the evaluation unit and sensors is conducted via a first data bus. In this case, the second data bus may, in particular, be an ordinary standardized data bus, whereas the first data bus can be specifically matched to the particular requirements in the region of the actuator. In the case of such a data bus, the individual associated elements, such as the sensors, can be addressed in a particularly simple manner via an address bit with a length of 1 byte, while data is subsequently transmitted. This would make it possible for one evaluation unit to address up to 256 different devices which can be connected to said evaluation unit via the bus. If more devices are to be connected to the evaluation unit, the size of the address field has to be correspondingly increased.

In particular, there may be a difference in the transmission rate between the first and the second data bus. For example, the second data bus, which controls communication between the controller and the evaluation unit, may, in particular, be a data bus which is clocked relatively slowly, whereas information can be transmitted between the sensors and the evaluation unit on the first data bus at a substantially higher speed. This measure makes it possible, in particular, for the evaluation unit to perform part of the evaluation and concentration of the measurement values and transmit the evaluated data to the controller.

According to one preferred refinement of the inventive method, both sensors and actuating elements are connected to the evaluation unit by means of the first data bus, it being possible for the evaluation unit to control the actuating elements via the data bus, and for said actuating elements to transmit data to the evaluation unit. This design makes it possible to arrange additional actuating elements in the region of the actuator, to control operation of said actuating elements and to monitor their period of operation. This relates particularly to actuating elements such as service brakes or blocking means which can be activated and deactivated during operation of the actuator.

According to one particularly preferred refinement of the invention, identification data, which allows the sensor or actuating element to be individually identified, is transmitted by the sensors and actuating elements—if present—which are connected to the evaluation unit. In this case, the identification data may include, in particular, the sensor type, manufacturer, order number and version of the sensor, as well as its serial number. As a result, this sensor is individualized compared to all of the other sensors, and the identification data can be used in the evaluation unit to check whether the sensors have changed, which could, for example, lead to the actuator or the device which is controlled by the actuator being removed. In particular, it is also possible to check whether a fitted sensor or a fitted actuating element has been replaced since the last time the actuator was stopped and before the subsequent starting. If this is not the case, the conclusion can be drawn that interference and faults have not been eliminated and at least one check can be initiated. Checks can also be made as to whether the sensors and actuating elements used are suitable for the current use. Therefore, a table of permitted sensors and sensor types or version numbers can be stored, for example, in the evaluation unit and a comparison can be made to check whether the sensor used is a permissible one.

According to one further refinement of the invention, provision may be made for sensors and actuating elements which are connected to the evaluation unit to transmit operating data, which includes operating parameters of the sensor or actuating element, at least once. The operating parameter data, which is transmitted to the evaluation unit by the actuating element or sensor, allows evaluations of the signals of the sensors to be moved to the evaluation unit, and at the same time to automatically match the evaluation in the evaluation unit to the sensor which is actually used, without the evaluation unit having to be set separately. According to one preferred refinement of the invention, the operating parameter data is transmitted to the evaluation unit by sensors or actuating elements particularly when it has been established on the basis of the identification data that the sensor or the actuating element was not previously registered in the evaluation unit. This also applies, for example, when the sensor has been replaced. A replacement sensor is registered by means of its identification data when the system is started. It is established that this identification data is not yet known to the evaluation unit. This then causes the sensor to transmit the operating parameter data, which characterizes it, to the evaluation unit.

According to one preferred further refinement of the invention, the data received from the sensors and actuating elements is evaluated in the evaluation unit. In this case, conversion of signal levels, such as measured voltage values, into measurement values, such as temperature in an electrical temperature sensor, may be performed in the evaluation unit, for example. The evaluation unit transmits the processed data, and not the data detected by the sensors, to the controller. This allows control in the controller on the basis of the real physical variables, while conversion and evaluation of the measurement signals have been transferred to the external evaluation unit. It is also possible to continuously detect and process the values of specific sensors in the evaluation unit, but transmit them to the control unit only on demand or only if required, for example when a sensor value leaves a setpoint operating range. It is therefore possible, for example, to automatically monitor whether the temperature in a bearing does not exceed a limit value. A signal is sent to the control unit by the evaluation unit only when the limit value is exceeded, it then being possible to take corresponding measures and perform control routines in the controller.

In a further preferred refinement of the invention, the data is processed in the evaluation unit as a function of the operating parameter data which has been transmitted to the evaluation unit by the sensors and actuating elements. It is thus possible, for example, for the sensor to transmit the sensor characteristic curve between measured variable and measurement value to the evaluation unit, said sensor characteristic curve applying to said sensor individually or being specific to that design. Therefore, a temperature sensor can, for example, transmit its applicable voltage/temperature characteristic curve when the sensor detects the measurement variable "temperature" by means of the measured variable "voltage" between two points. If the sensor is replaced, the operating parameter data of the newly fitted sensor is transmitted to the evaluation unit, so that the evaluation unit always uses the characteristic curve of the sensor which is connected to the evaluation unit at that time. Faults, which could be produced in conjunction with maintenance work for example, in the evaluation of the measured data can therefore be avoided when components are replaced by other components, said components not necessarily having the same characteristics.

Configuration data, which particularly includes the list of required sensors and actuating elements and the specifications to be met, can be transmitted to the evaluation unit by means of a configuration memory, which is arranged on the actuator, via the first data bus. Following transmission, possibly of this data too, to the evaluation unit, said evaluation unit can check whether the actual configuration satisfies these requirements in terms of presence and standards. As an alternative, provision may be made for the configuration memory to be retained externally and for required data to be transmitted to the evaluation unit and/or the controller.

BRIEF DESCRIPTION OF THE DRAWINGS

An exemplary embodiment of the invention is explained in greater detail below with reference to the drawing, in which.

DETAILED DESCRIPTION OF A PREFERRED EMBODIMENT

Figure 1:
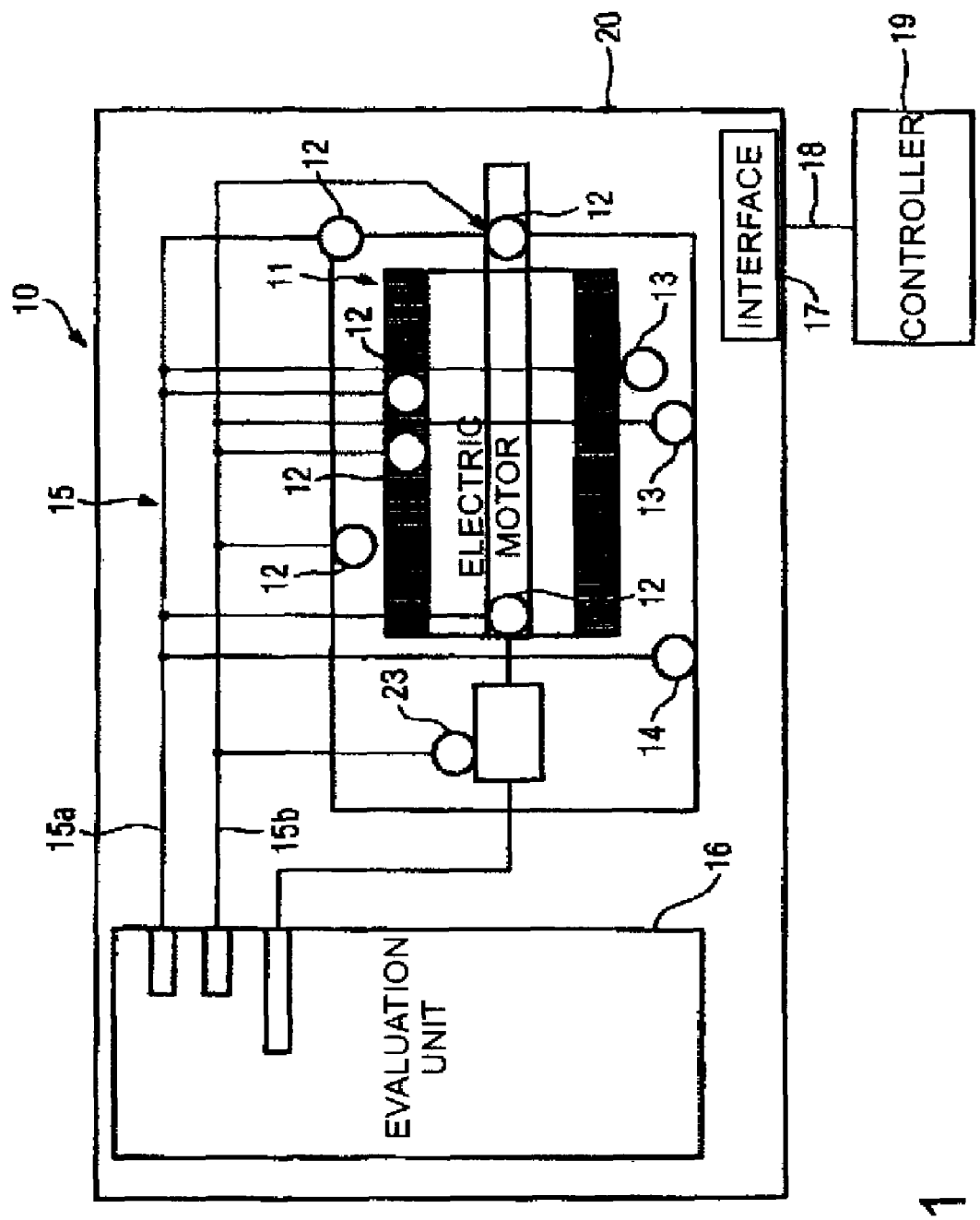
FIG. 1 shows an inventive actuator with an evaluation unit.

FIG. 1 shows the actuator 10 which, in the illustrated exemplary embodiment, has an actuating unit in the form of an electric motor 11. The data of the sensors 12 and, for example, from the actuating elements 13 and characteristic data, which is stored in memories and characterizes the actuator and its form, is transmitted to the evaluation unit 16 via the two lines 15a and 15b of the first data bus 15. The identification data, which is stored, can be used to check requirements which have to be satisfied by specific sensors and actuating means, and it is possible to establish which configuration of sensors and actuating elements is provided. This can be compared with memory data which is stored in the specification memory 23 and can be read out by the evaluation unit 16. The sensors 12 and the actuating elements 13 transmit their measurement values, but also their identification data and their operating parameter data, to the evaluation unit 16 via the two lines 15a and 15b of the first data bus which are arranged parallel to one another. The evaluation unit 16 is connected to the controller 19 by means of an interface 17, which is arranged on the housing of the actuator 10, via a second data bus 18.

The control unit uses the automatic conversion of the data transmitted by the sensors into measurement values just like it uses the verification of the identification data and adjustment of the operating parameter data if this data changes. Furthermore, measured variables, for example the voltage in a temperature sensor, are converted in the evaluation unit into the measurement variables, for example the temperature which is to be associated with the voltage value, using characteristic curves or characteristic tables maps.

In particular, the data of the sensors 12 and the actuating elements 13 can be transmitted to the evaluation unit 16 in a temporally cyclical manner. The evaluation unit 16 then determines corresponding data either cyclically or as required or when demanded by the controller 19, since it is connected to the controller 19 by means of the interface 17 via the second data bus which may use a completely different bus protocol and may be a data bus which is used as standard in industrial applications. In this case, the controller 19 is positioned spatially outside the actuator or else outside the machine on which the actuator can be arranged. In the illustrated exemplary embodiment, the evaluation unit 16 is arranged in the housing 20 of the actuator 10. Arrangement in the region of the housing, but also in the vicinity of the actuator, but outside its housing, is likewise feasible but associated with higher outlay on connection.

Figure 2:
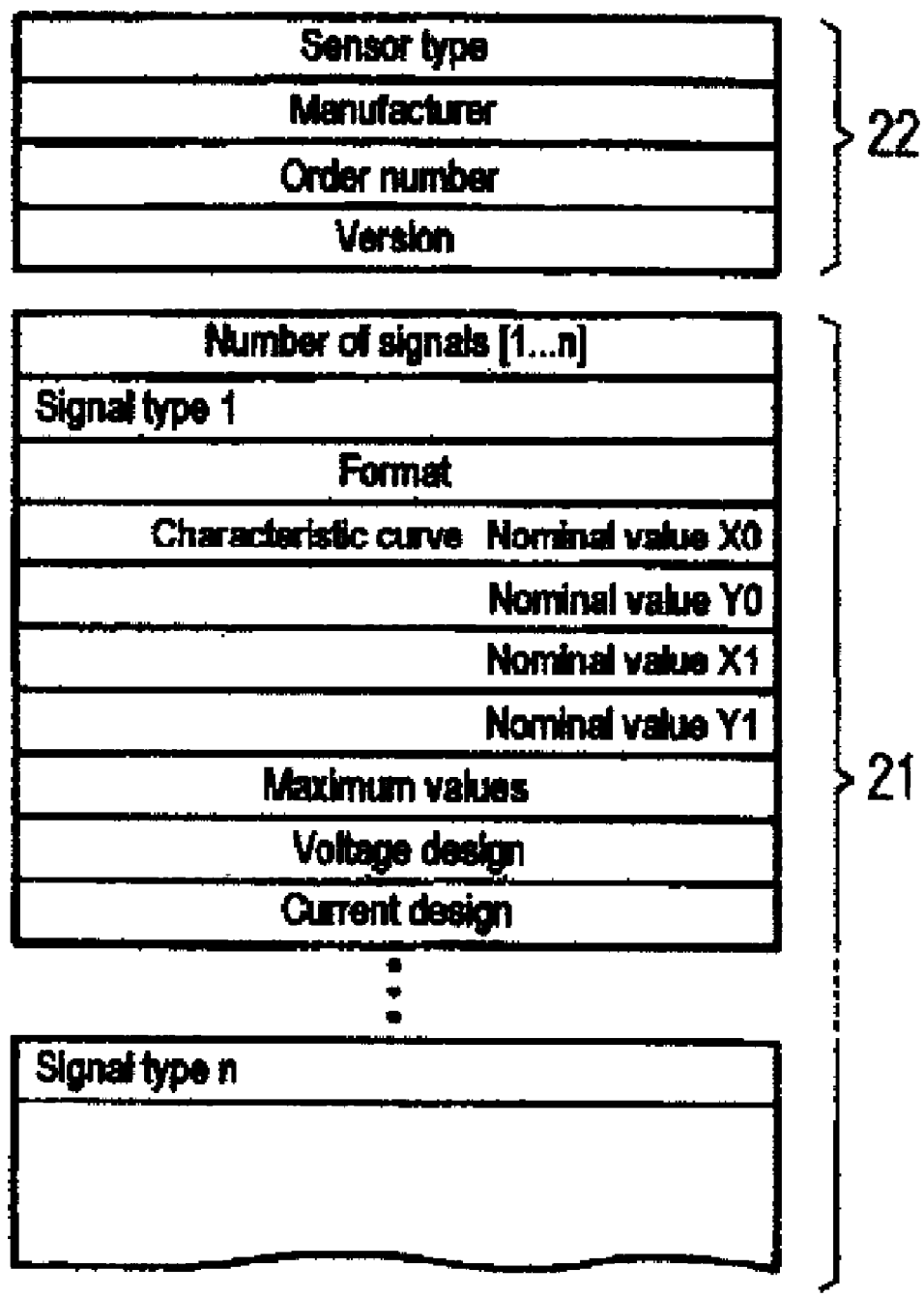
FIG. 2 shows a schematic illustration of the identification and operating parameter data which is stored in sensors and actuating elements.

FIG. 2 schematically shows the blocks of data which are stored as operating parameter data 21 and identification data 22 in a memory of the sensor and can be read out by the evaluation unit or transmitted to the evaluation unit. In this case, the identification data 22 includes, in particular, the sensor type, the type of manufacturer, the order number and the version number of the sensor or actuating element, but it may also include the serial number.

For each signal type provided by a sensor, the operating parameter data 21 includes which sensor transmits it to the evaluation unit. This may be, for example, information about whether a temperature sensor transmits data continuously or when a threshold value is crossed, whether an acceleration sensor measures absolute acceleration values or relative acceleration, or the unit of measurement in which the values of a distance sensor are given. Furthermore, characteristic data about the version number, the structure, the format and the data values themselves can be stored according to the signal type. In addition to the format data, characteristic curve data, for example reference values and associated reference variables, can be stored, so that the characteristic curve of the sensor is determined by means of extrapolation from a plurality of associated pairs of reference values and reference variables. Also, specific operating voltages, operating currents and other limits of the range of use of the actuator or sensor can be stored according to the signal type and transmitted to the evaluation unit for further processing.

Figure 3:
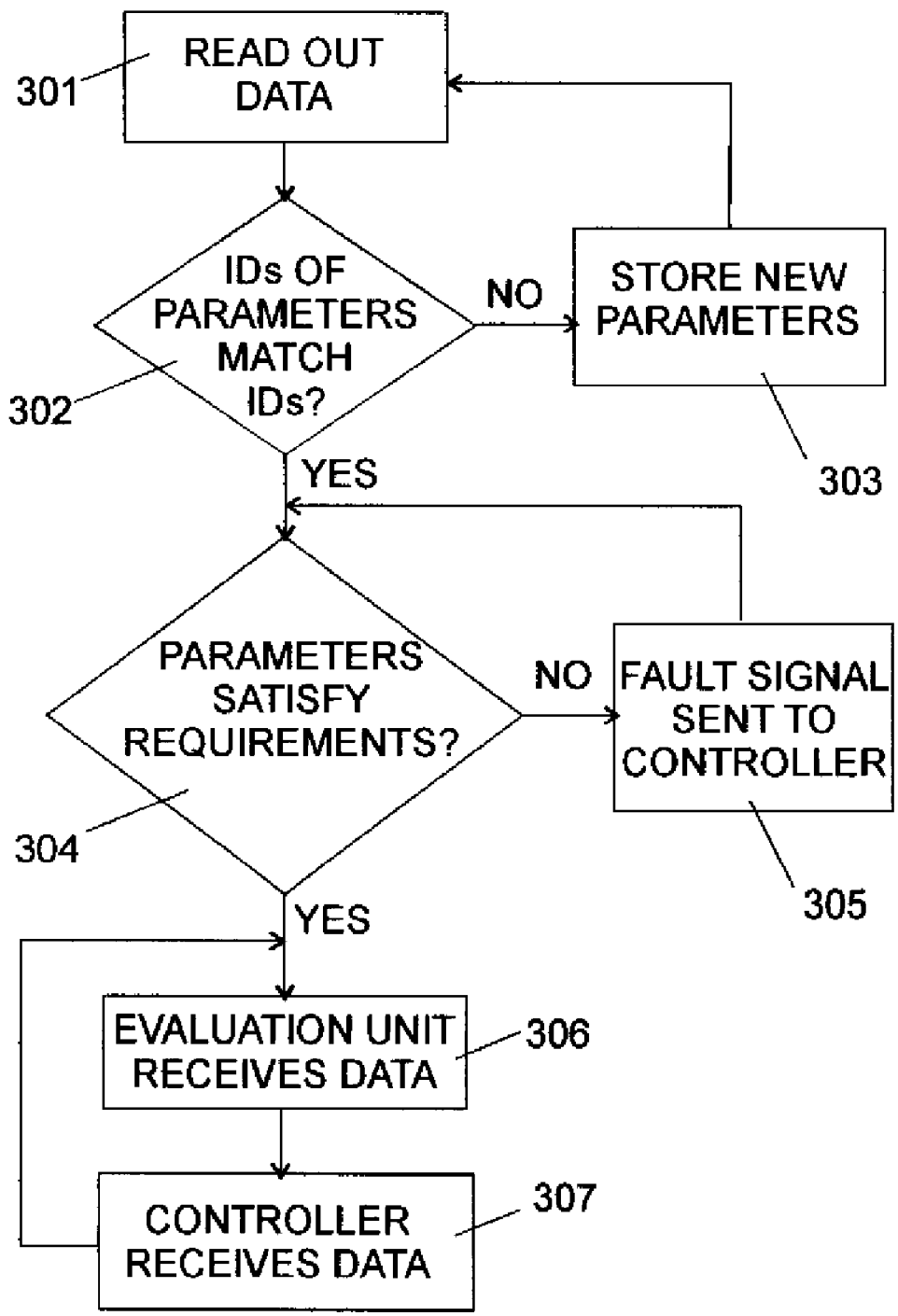
FIG. 3 shows the flowchart for an inventive method.

FIG. 3 shows the flowchart of an inventive method for operating an actuator. According to step 301 of the method, starting of the system is initially followed by the specification data being read out from the specification memory 23 and the identification data of all of the connected sensors 12 and actuating elements 13 being interrogated by the evaluation unit 16. According to step 302, the identification data which has now been read in is compared with the stored identification data, and the process jumps to step 303 if there are differences in the case of one or more sensors. According to step 303, the identification data for the first sensor for which a difference has been established is written to the memory and the operating parameters of this sensor are read in and used later. The process then jumps back to step 301. The loop comprising steps 301, 302 and 303 is run through until it is established in step 302 that all of the connected sensors 12 and actuating elements 13 with identification and associated operating parameter data which is already known are stored in the memory of the evaluation unit 16, and corresponding processing of the data is enabled. The process then moves on to step 304. In step 304, a check is made to determine whether the properties of all of the sensors and actuating elements correspond to requirements, and whether all of the sensors and actuating elements which are required according to the characteristic data 14 are activated and present—that is to say satisfy the specification data. If this is not the case, a fault signal is generated and transmitted to the controller 19 via the second data bus according to step 305. Otherwise, a readiness signal is transmitted to the controller 19 via the second data bus 18 in step 306. According to step 307, the controller now continuously evaluates the data and measurement values which are transmitted to the evaluation unit 16 via the first data bus 15. According to step 308, the data is transmitted, cyclically or on demand, to the controller 19, with the second data bus 18 being used for this purpose. Steps 307 and 308 are now continuously carried out during the entire operation of the actuator and the control unit.

What is claimed is:

1. An actuator having an operating state, comprising:
   at least one actuating element;
   a plurality of sensors, said sensors being adapted to detect measurement variables when the actuator is in the operating state;
   a first data bus;
   an evaluation unit connected to at least one sensor of the plurality of sensors and to the actuating element by the first data bus;
   a controller adapted to control the actuator; and
   a second data bus, said second data bus connecting the evaluation unit to the controller, said controller being adapted to control the actuator through the evaluation unit using the second data bus connecting the evaluation unit to the controller.

2. The actuator of claim 1, further comprising a plurality of said actuating elements, said plurality of sensors and plurality of actuating elements being connected to the evaluation unit by the first data bus.

3. The actuator of claim 1, further comprising data in at least one sensor and at least one actuating element, said data being adapted to be transmitted to the evaluation unit, said data including identification data and operating parameter data.

4. The actuator of claim 1, further comprising an electric motor adapted to drive the actuator; and at least one return-blocking means in an actuator element, said return blocking means being adapted to block a rotary movement of the electric motor when the actuator is not driven by the motor.

5. The actuator of claim 4, wherein the electric motor is a linear-drive motor.

6. The actuator of claim 1, further comprising a housing, said evaluation unit being disposed in the housing; and a connector on the housing, said connector being adapted to connect the evaluation unit to the controller via the second data bus.

7. The actuator of claim 6, wherein the connector is a plug connector adapted to be connected to a cable outside the housing.

8. An actuator having an operating state, comprising:
at least one actuating element;
a plurality of sensors, said sensors being adapted to detect measurement variables when the actuator is in the operating state;
a first data bus;
an evaluation unit connected to at least one sensor of the plurality of sensors and to the actuating element by the first data bus;
means for comparing operating parameters to required parameters; and
means for providing data from the first data bus to the evaluation unit when an operating parameter satisfies a required parameter.

9. The actuator of claim 8, further comprising means for providing a fault signal to the controller over the second data bus when an operating parameter does not satisfy a required parameter.

10. A method for operating an actuator having an evaluation unit connected to at least one sensor and to at least one actuating element via a first data bus, a controller adapted to control the actuator and a second data bus, said second data bus being adapted to connect the controller to the actuating element, said sensor and actuating element having data representing an operating state of the actuator, said method comprising the steps of:
transmitting data from the sensor to the evaluation unit using the first data bus;
transmitting data from the actuating element to the evaluation unit using the first data; and
using the controller and the second data bus to control the actuator through the evaluation unit.

11. The method of claim 10, further comprising the step of controlling an actuating element using the first data bus.

12. The method of claim 10, further comprising the step of transmitting identifying data that identifies a data source of data transmitted to the evaluation unit using the first data bus.

13. The method of claim 10, further comprising the steps of transmitting operating parameter data for a data source of data transmitted to the evaluation unit using the first data bus.

14. The method of claim 13, further comprising the steps of transmitting identifying data that identifies a data source of data transmitted to the evaluation unit using the first data bus, determining whether the evaluation unit has operating parameter data for a data source represented by the identification data, and transmitting operating parameter data from an operating parameter source to the evaluation unit, when the evaluation unit does not have operating parameter data for the data source represented by the identification data.

15. The method of claim 13, wherein operating parameter data has been sent to the evaluation unit from a plurality of sources, and further comprising the step of processing the data transmitted to the evaluation unit using the first data bus as a function of the operating parameter data.

16. The method of claim 10, further comprising the steps of at least partially processing data transmitted from the sensors and actuating elements to the evaluation unit in the evaluation unit; and transmitting the at least partially processed data from the evaluation unit to the controller.

17. The method of claim 16, wherein the processing step includes the steps of comparing operating parameters to required parameters, and providing a fault signal to the controller over the second data bus when an operating parameter does not satisfy a required parameter.

18. The method of claim 16, wherein the processing step includes the steps of comparing operating parameters to required parameters, and providing data from the first data bus to the evaluation unit when an operating parameter satisfies a required parameter.

19. The actuator of claim 1, wherein an actuating element is adapted to be controlled using the first data bus.

20. The actuator of claim 8, wherein an actuating element is adapted to be controlled using the first data bus.

21. A method for operating an actuator having an evaluation unit connected to at least one sensor and to at least one actuating element via a first data bus, said sensor and actuating element having data representing an operating state of the actuator, said method comprising the steps of:
transmitting data from the sensor to the evaluation unit using the first data bus;
transmitting data from the actuating element to the evaluation unit using the first data bus;
comparing operating parameters to required parameters; and
providing data from the first data bus to the evaluation unit when an operating parameter satisfies a required parameter.

22. The method of claim 21, further comprising the step of providing a fault signal to the controller over the second data bus when an operating parameter does not satisfy a required parameter.

23. The actuator of claim 1, further comprising means for comparing operating parameters to required parameters; and means for providing data from the first data bus to the evaluation unit when an operating parameter satisfies a required parameter.

24. The actuator of claim 1, wherein the first and second bus have different bus protocols.

25. The actuator of claim 8, wherein the first and second bus have different bus protocols.

* * * * *